(No Model.)  C. J. CUMMINGS.  2 Sheets—Sheet 1.
POTATO DIGGER.

No. 566,446.  Patented Aug. 25, 1896.

Witnesses:
Theo. L. Popp
F. Gustav Wilhelm

Charles J. Cummings Inventor.
By Wilhelm & Bonner
Attorneys.

(No Model.) 2 Sheets—Sheet 2.

C. J. CUMMINGS.
POTATO DIGGER.

No. 566,446. Patented Aug. 25, 1896.

Chas. J. Cummings, Inventor.
Theo. L. Popp,
F. Gustav Wilhelm, Witnesses.
By Wilhelm Bonner, Attorneys.

UNITED STATES PATENT OFFICE.

CHARLES J. CUMMINGS, OF TULLY, NEW YORK.

POTATO-DIGGER.

SPECIFICATION forming part of Letters Patent No. 566,446, dated August 25, 1896.

Application filed April 6, 1895. Serial No. 544,742. (No model.)

*To all whom it may concern:*

Be it known that I, CHARLES J. CUMMINGS, a citizen of the United States, residing at Tully, in the county of Onondaga and State of New York, have invented a new and useful Improvement in Potato-Diggers, of which the following is a specification.

This invention relates to a potato-digger which is provided with scoops which dig into the hill and loosen and elevate the earth and potatoes and with a shaking separator which is arranged in rear of the scoops and which receives the earth and potatoes therefrom and agitates the material, so as to work the greater part of the earth through the spaces between the tines of the separator, while the residue is discharged over the rear end of the separator, with the potatoes resting on the surface of the earth, where they can be easily picked up. A potato-digger of this character is described and shown in Letters Patent of the United States No. 415,180, granted to me November 19, 1889.

My present invention has the object to improve the construction and arrangement of various parts of the potato-digger with a view of rendering the same more effective in operation.

Figure 1:
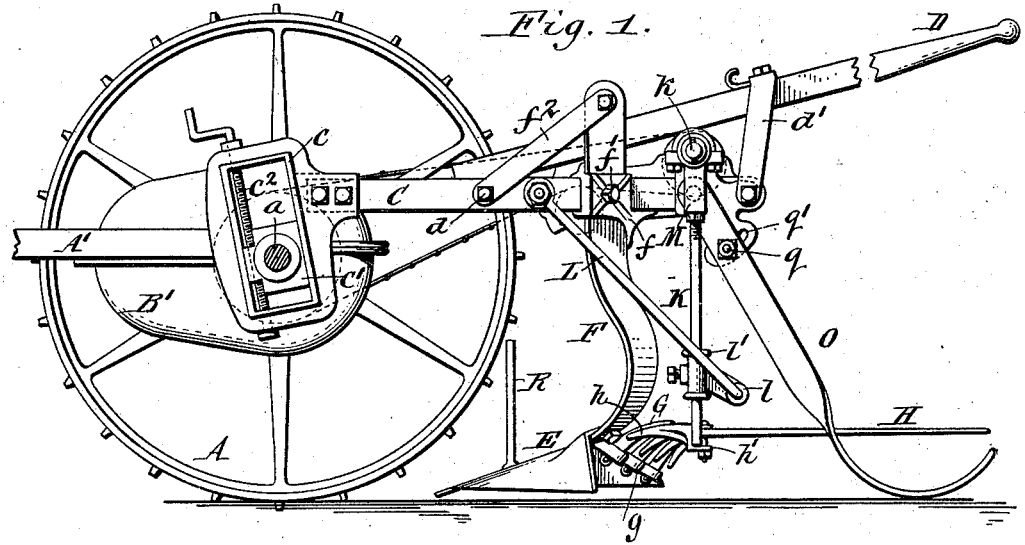
Figure 2:
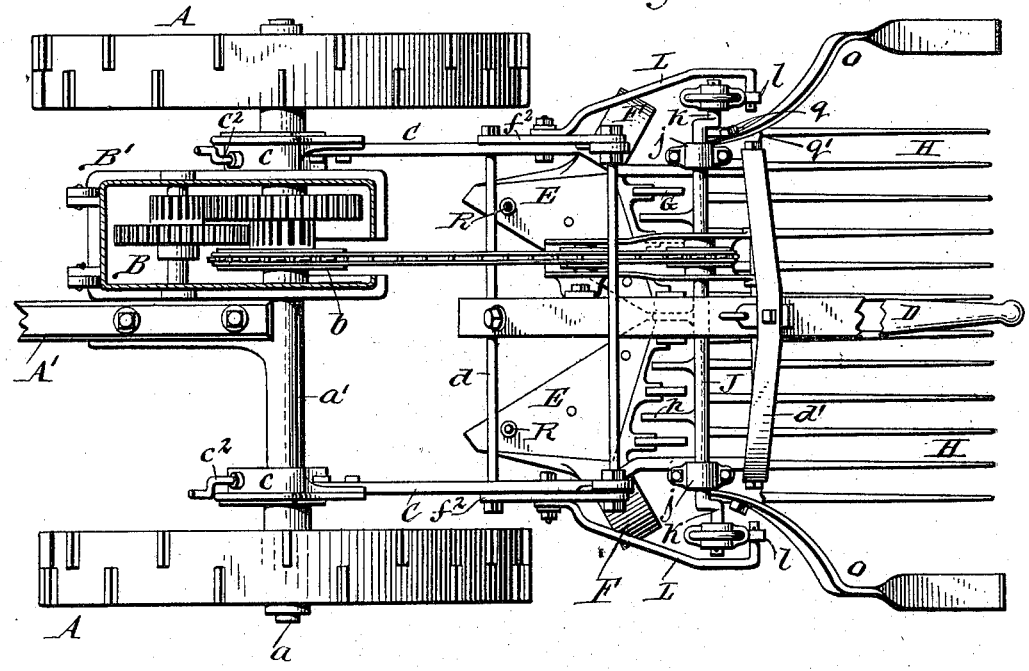
Figure 3:
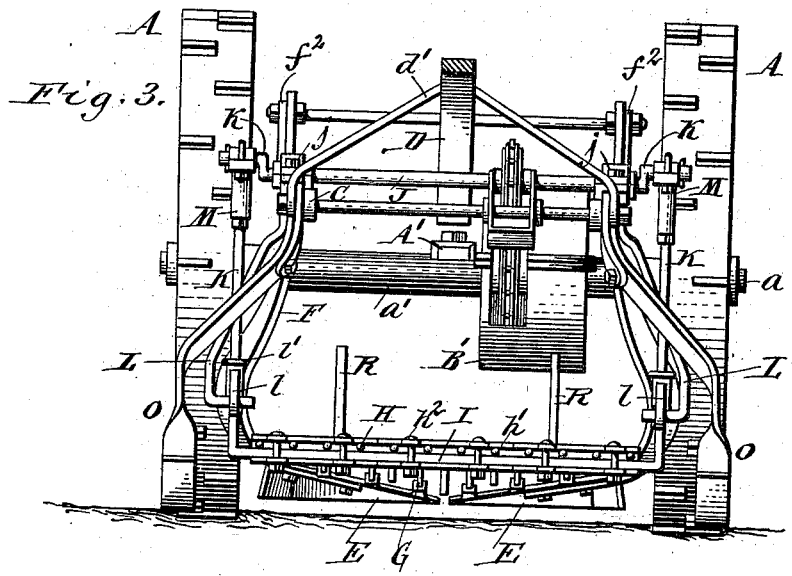
Figure 4:
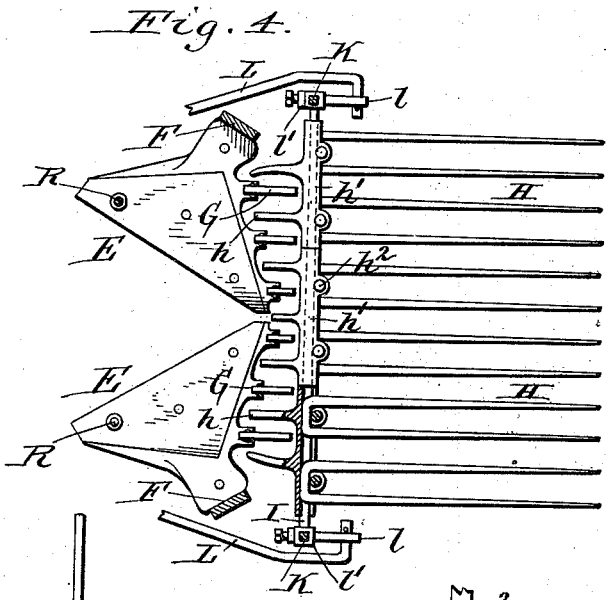
Figure 5:
Figure 6:
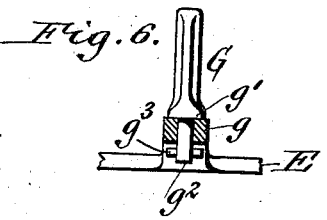
Figure 7:
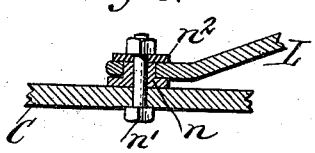
Figure 8:
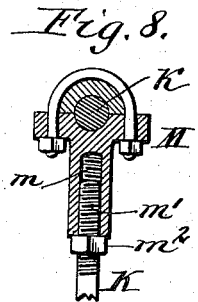

In the accompanying drawings, Figure 1 is a side elevation of the potato-digger with one of the ground-wheels removed. Fig. 2 is a top plan view of the machine with the housing of the gear-wheels in section. Fig. 3 is a rear elevation of the machine. Fig. 4 is a top plan view of the scoops and the separator, partly in section. Fig. 5 is a longitudinal section through one of the scoops and the front part of the separator on an enlarged scale. Fig. 6 is a cross-section through one of the tine-sockets of the scoops, showing the tine in rear elevation. Fig. 7 is a horizontal section, on an enlarged scale, through the pivot portion of one of the movable angle-braces. Fig. 8 is a vertical section, on an enlarged scale, of one of the heads of the actuating-rods.

Like letters of reference refer to like parts in the several figures.

A A represent the ground-wheels, mounted on the axle $a$, which passes through a sleeve $a'$, to which the draft-pole A' is secured. B represents a train of gear-wheels which, in a well-known manner, transmit motion from the axle $a$ to a sprocket-wheel $b$, loosely mounted on the axle. B' is the housing inclosing the gear-wheels and sprocket-wheel and secured to the sleeve $a'$. All of these parts may be constructed and arranged in any suitable or well-known manner.

C C represent two side or draft bars extending rearwardly from the axle near the inner sides of the ground-wheels and connecting the scoops and separator with the axle. Each of these draft-bars is provided at its front end with an upright slotted frame $c$, which bears against the front and rear sides of a bearing-box $c'$, mounted on the axle and on which the slotted frame can be raised or lowered by a suitable adjusting device, for instance, an upright screw $c^2$, turning in bearings in the upper and lower parts of the slotted frame and working in a threaded opening in the bearing-box.

$d$ represents a cross-bar connecting the draft-bars C at a short distance in rear of the housing B'. The draft-bars are bent inwardly at a short distance in rear of this cross-bar $d$ and extend thence rearwardly parallel to each other to their rear ends, where they are connected by an arched cross-bar $d'$.

D is a handle which is secured with its front end to the front cross-bar $d$ and with its middle portion to the arched rear cross-bar $d'$ and which extends rearwardly beyond the latter.

E E represent the scoops, and F F the standards by which the scoops are secured to the draft-bars C. The scoops are approximately triangular in form and have their front edges extending inwardly and rearwardly, so as to converge toward the center line of the machine. Each scoop is secured to the lower end of its standard, and the latter is bent outwardly above the scoop to clear the tops or vines, &c., and then inwardly and is secured with its upper portion to the outer side of the draft-bar at the inwardly-bent portion of the latter, preferably by means of a casting or clasp $f$, which straddles the draft-bar and the standard and which is secured by a bolt $f'$. Each standard extends above the draft-bar and is connected therewith by a rigid oblique brace $f^2$, extending from the upper end of the standard downwardly and forwardly to the cross-bar $d$, by which it is secured to the draft-bar. This brace adds greatly to the rigidity of the fastening and enables the scoop and standard to better resist the pressure and shocks to which they are subjected.

G represents the rearwardly-projecting tines or teeth, which are attached to the scoops along their rear edges at suitable distances apart and project rearwardly and upwardly therefrom.

H represents the long main tines or longitudinal bars of the shaking separator, projecting rearwardly from the cross-head I at the front of the separator, and $h$ represents the short front tines or teeth of the separator, which project forwardly from the cross-head into the spaces between the tines of the scoops. The rear tines G of the scoops are movably connected with the scoops, so that they can swing in a vertical plane to a limited extent and yield forwardly when a stone or other hard substance is thrown or pressed against the rear or under side of a tine by the separator or otherwise. In order to connect these tines yieldingly with the scoops, the latter are provided with rearwardly-projecting sockets $g$, and each tine is provided at its lower end with a shoulder $g'$, by which it rests on the socket and below the shoulder with a tenon $g^2$, which fits snugly into the socket at both sides, but has play at the front and rear, as clearly indicated in Figs. 5 and 6. The tine overhangs rearwardly and is held in its rearwardly-projecting position by gravity and by the pressure of the earth moving over the scoops and tines; but when the tine is subjected to an unusual pressure from below or behind it yields forwardly and frees itself, whereby breakage is avoided. The tines are prevented from being pulled out of their sockets by cross-pins $g^3$, secured to the tenons below the sockets or by other suitable devices. The tines, being loosely fitted in their sockets, are not interfered with by earth which may work into the sockets, as such earth will readily work out again, and if a tine should break, notwithstanding this loose connection, it is readily removed and replaced.

J represents the transverse shaft, which is driven by the gearing on the axle and by which the shaking separator is actuated, as in my former patent above referred to, and which is journaled in bearings $j$, secured to the rear portions of the draft-bars C.

K represents the actuating-rods, which are connected with their upper ends to the cranks $k$ at the ends of the shaft J and with their lower ends to the cross-head I.

L represents the movable inclined braces, pivoted with their upper front ends to the draft-bars C and extending downwardly and rearwardly therefrom to arms or brackets $l$, which project rearwardly from the lower portions of the actuating-rods K. By this mechanism a compound movement is imparted to the separator, which movement takes place at the front end of the separator forwardly and upwardly and then backwardly and downwardly, as in my former patent.

The rear tines G of the scoops project upwardly and slightly rearwardly, so as to form at the rear ends of the scoops an elevated open grating against which the mass of earth and potatoes is forced. The cross-head I of the separator is arranged above the scoops and the front tines project downwardly and forwardly from the cross-head, so as to move forwardly and upwardly through the elevated grating formed by the upwardly-projecting tines, whereby the separating action is greatly improved.

The cross-head I is preferably formed of square iron and in one piece with both actuating-rods K, as represented in Figs. 3, 4, and 5. The main tines of the separator are preferably formed in pairs, two in one piece, and secured upon the cross-head by the base or socket portions $h'$ of the front tines $h$. Each of these socket portions carries several of the front tines and is open on its rear side and bears with its front portion against the front side of the cross-head I and the connecting portions of the pairs of main tines resting on the cross-head, with its top portion on the connecting portions of the main tines and with its bottom portion against the under side of the cross-head, as represented in Fig. 5. The socket portions $h'$ of the front tines are secured to these parts by upright bolts $h^2$.

The upper ends of the actuating-rods are connected with the cranks $k$ of the shaft J by heads M, (shown in detail in Fig. 8,) in which heads the upper ends of the rods are vertically adjustable, so that the rods can be lengthened or shortened. For this purpose each head is provided in its lower portion with a screw-socket $m$ and the rod with a screw-threaded upper end $m'$, engaging therein, and with a jam-nut $m^2$ for securing the head after adjustment. When the rod requires to be lengthened or shortened, the head is removed from the crank-pin and adjusted up or down on the rod, as may be required. Each arm or bracket $l$ on the lower portion of the rod is provided with a socket $l'$, made vertically adjustable on the rod, so that the arm can be adjusted up or down on the rod.

By lengthening or shortening the actuating-rods the cross-head of the separator is lowered or raised, so that by means of this adjustment the cross-head can be placed at the desired height above the scoops. Upon lowering the cross-head it is at the same time moved forwardly by the angle-braces, which are swung downwardly and forwardly on their pivots by such lowering of the cross-head, while by raising the cross-head it is also moved backwardly by the resulting movement of the angle-braces. In order to prevent this shifting of the cross-head forwardly and backwardly upon lowering or raising it when no such forward or backward shifting of the cross-head is desired, the arms $l$ are adjusted on the actuating-rods upwardly when the cross-head is lowered and downwardly when the cross-head is raised.

In order to permit the angle-braces to turn freely on their pivots, the upper front ends of the braces are mounted upon hollow shouldered pivots $n$, Fig. 7, upon which the ends of the braces turn and which are secured to the outer sides of the draft-bars C by bolts $n'$, having washers $n^2$, by which the ends of the braces are confined upon the pivots.

O O represent two trailing bars having curved shoes at their lower ends, by which they ride over the ground. These trailing bars are secured with their upper ends to the rear ends of the draft-bars C, and their lower ends are made adjustable up and down, so that the rear ends of the draft-bars can be carried higher or lower. By adjusting the front ends of the draft-bars up or down with reference to the axle by means of the slotted frames and by adjusting the trailing bars similarly the digger mechanism is raised and lowered as may be necessary to give it the required depth of cut for efficient work, and the digger mechanism is carried level or substantially so when in operation. The trailing bars are preferably pivoted at their upper ends to the rear ends of the draft-bars and adjusted by bolts $q$, which pass through segments $q'$, formed, preferably, on the castings on which the bearings of the transverse shaft J are formed.

R represents upright rods which are secured to the scoops near their front corners or points and which project upwardly therefrom and confine the tops or vines, which is especially desirable when digging on sidehills.

I claim as my invention—

1. In a potato-digger, the combination with the scoop having at its rear end sockets which are open upwardly and downwardly, of tines having shoulders by which they rest on the sockets and having below the shoulders tenons which extend downwardly through the sockets and fit snugly against the sides thereof but have play therein at the front and rear, and fastenings whereby the tines are loosely held in the sockets, substantially as set forth.

2. In a potato-digger, the combination with the scoop having at its rear end tines which project upwardly and rearwardly from the scoop, of a shaking separator arranged in rear of the scoop and higher than the same and having at its front end tines which project downwardly and forwardly from the separator into the spaces between the upwardly-projecting rear tines of the scoop, substantially as set forth.

3. The combination with the separator cross-head, of connected main tines resting with their front portions upon the cross-head, front tines provided with sockets which are open on their rear sides and which embrace the front and bottom of the cross-head and the front and top of the connecting portion of the main tines, and upright fastening-bolts arranged in rear of the cross-head and connecting the upper and lower portions of the sockets of the front tines, substantially as set forth.

4. The combination with the shaking separator, its actuating-shaft and the draft-bars, of actuating-rods connecting said shaft with the separator and capable of lengthwise adjustment for raising and lowering the separator, angle-braces pivoted at their upper ends the draft-bars, and supporting-arms connected with the lower ends of the braces and made vertically adjustable on the actuating-rods, substantially as set forth.

5. The combination with the shaking separator, its actuating crank-shaft and the draft-bars, of heads connected with the cranks and having screw-sockets, rods having screw-threaded upper ends engaging in said sockets and connected at their lower ends with the separator, angle-braces pivoted at their upper ends to the draft-bars, and supporting-arms connected with the lower ends of the braces and made vertically adjustable on the actuating-rods, substantially as set forth.

6. The combination with the scoops and the shaking separator, of draft-bars carrying the scoops and the separator and provided at their front ends with upright slotted frames, ground-wheels mounted on a shaft which passes through said slotted frames, bearing-boxes mounted on said shaft and bearing with their front and rear sides against the front and rear sides of the slotted frames, and means whereby the slotted frames can be raised and lowered on said boxes, substantially as set forth.

Witness my hand this 4th day of February, 1895.

CHARLES J. CUMMINGS.

Witnesses:
ELLIS V. KING,
MARTIN VAIL.